United States Patent [19]

Matsuura

[11] Patent Number: 4,985,924
[45] Date of Patent: Jan. 15, 1991

[54] SPEECH RECOGNITION APPARATUS

[75] Inventor: Hiroshi Matsuura, Odawara, Japan

[73] Assignee: Kabushiki Kaisha Toshiba, Kawasaki, Japan

[21] Appl. No.: 453,269

[22] Filed: Dec. 21, 1989

Related U.S. Application Data

[63] Continuation of Ser. No. 287,329, Dec. 21, 1988, abandoned.

[30] Foreign Application Priority Data

Dec. 24, 1987 [JP] Japan .................................. 62-325368

[51] Int. Cl.⁵ .............................................. G10L 7/08
[52] U.S. Cl. ....................................................... 381/43
[58] Field of Search ................................... 381/41–46; 364/513.5

[56] References Cited

U.S. PATENT DOCUMENTS

| | | | |
|---|---|---|---|
| 4,581,756 | 4/1986 | Togawa et al. | 381/43 |
| 4,624,010 | 11/1986 | Takebayashi | 381/43 |
| 4,625,287 | 11/1986 | Matsuura et al. | 381/43 |
| 4,723,290 | 2/1988 | Watanabe et al. | 381/43 |

FOREIGN PATENT DOCUMENTS 59-197974  11/1984  Japan .

OTHER PUBLICATIONS

Tsuboi et al, "Speaker Adaptive Connected Syllable Recognition Based on the Multiple Similarity Method", IEEE ICASSP 86, 4/86, 2655-2658.

Primary Examiner—Gary V. Harkcom
Assistant Examiner—John A. Merecki
Attorney, Agent, or Firm—Oblon, Spivak, McClelland, Maier & Neustadt

[57] ABSTRACT

A similarity memory stores a syllable recognition candidate and its similarity (j) supplied from a syllable recognition section at a specific storage position defined by reference syllable data and its syllable position (i), stores a subsidiary similarity (j−10) at an (i+1)th syllable position of the same syllable name, and stores a subsidiary similarity (j−20) at an (i+2)th syllable position of the same syllable name. The subsidiary similarity (j−10) is also stored at the (i+1)th syllable position of the same syllable name. A coincidence computing section computes a sum of similarities of a series of n syllables from the similarity memory and computes a coincidence.

2 Claims, 8 Drawing Sheets

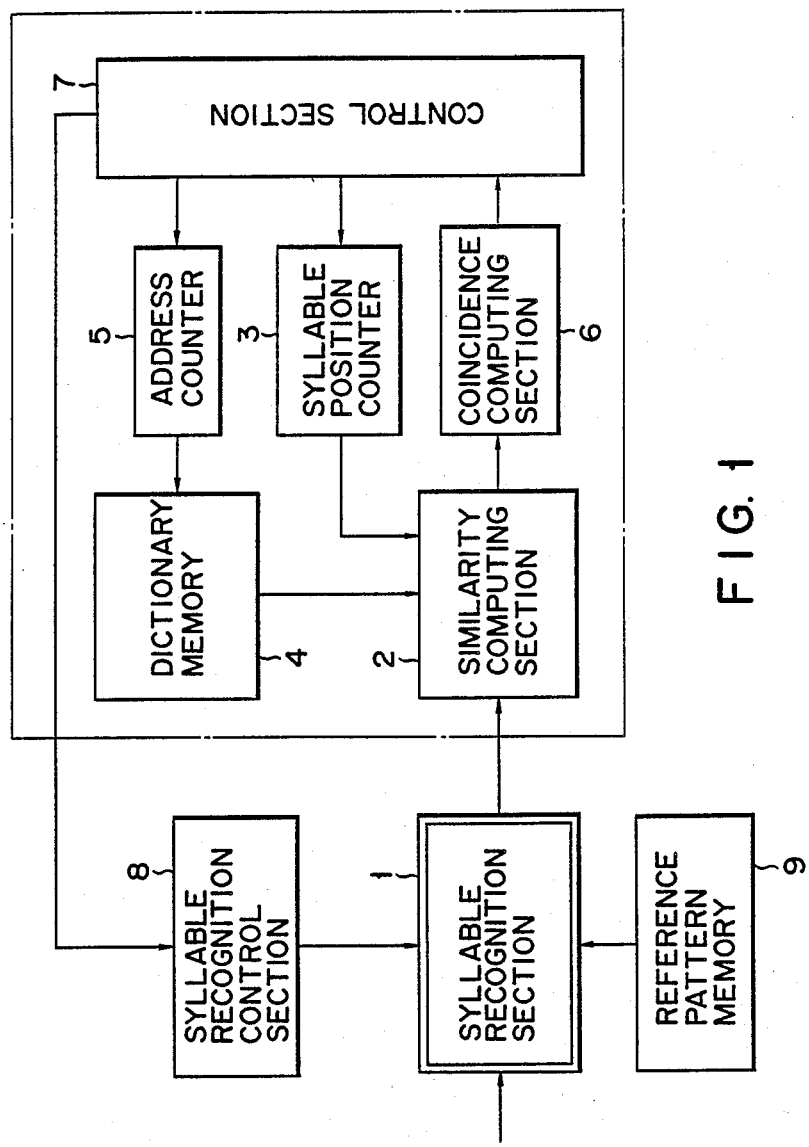
F I G. 1

| SYLLABLE \ CANDIDATE | 1 | | 2 | | 3 | | 4 | |
|---|---|---|---|---|---|---|---|---|
| | SYLLABLE NAME | SIMILARITY | SYLLABLE NAME | SIMILARITY | SYLLABLE NAME | SIMILARITY | SYLLABLE NAME | SIMILARITY |
| FIRST | と (to) | 80 | く (ku) | 70 | きょ (kyo) | 70 | う (u) | 80 |
| SECOND | ぽ (po) | 40 | ふ (fu) | 60 | ぴょ (pyo) | 60 | く (ku) | 50 |
| THIRD | あ (a) | 30 | う (u) | 50 | びょ (byo) | 50 | ぷ (pu) | 40 |
| CORRECT ANSWER ITEM OF WORD DICTIONARY MEMORY | と (to) | | う (u) | | きょ (kyo) | | う (u) | |

| SYLLABLE NAME \ SYLLABLE POSITION i | FIRST SYLLABLE | SECOND SYLLABLE | THIRD SYLLABLE | FOURTH SYLLABLE |
|---|---|---|---|---|
| あ (ə) | 30 | | | |
| か (kə) | | | | |
| さ (sə) | | | | |
| う (u) | | 50 | | 80 |
| く (ku) | | 70 | | 50 |
| す (su) | | | | |
| ふ (fu) | | 60 | | |
| ぷ (pu) | | | | 40 |
| お (o) | | | | |
| こ (ko) | | | | |
| そ (so) | | | | |
| と (to) | 80 | | | |
| の (no) | | | | |
| ご (go) | | | | |
| ぞ (zo) | | | | |
| ど (do) | | | | |
| ぼ (bo) | | | | |
| ぽ (po) | 40 | | | |
| きょ (kyo) | | | 70 | |
| じょ (jo) | | | | |
| びょ (byo) | | | 50 | |
| ぴょ (pyo) | | | 60 | |
| ん (n) | | | | |

| SYLLABLE \ CANDIDATE | 1 | | 2 | | 3 | | 4 | |
|---|---|---|---|---|---|---|---|---|
| | SYLLABLE NAME | SIMILARITY | SYLLABLE NAME | SIMILARITY | SYLLABLE NAME | SIMILARITY | SYLLABLE NAME | SIMILARITY |
| FIRST | と (to) | 80 | きょ (kyo) | 70 | う (u) | 80 | | |
| SECOND | ぽ (po) | 40 | ぴょ (pyo) | 60 | く (ku) | 50 | | |
| THIRD | あ (a) | 30 | びょ (byo) | 50 | ぷ (pu) | 40 | | |
| CORRECT ANSWER ITEM OF WORD DICTIONARY MEMORY | と (to) | | う (u) | | きょ (kyo) | | う (u) | |

| SYLLABLE NAME \ SYLLABLE POSITION i | FIRST SYLLABLE | SECOND SYLLABLE | THIRD SYLLABLE |
|---|---|---|---|
| あ (ə) | 30 | | |
| か (kə) | | | |
| さ (sə) | | | |
| う (u) | | | 80 |
| く (ku) | | | 50 |
| す (su) | | | |
| ぷ (pu) | | | 40 |
| え (e) | | | |
| お (o) | | | |
| こ (ko) | | | |
| そ (so) | | | |
| と (to) | 80 | | |
| の (no) | | | |
| ご (go) | | | |
| ぞ (zo) | | | |
| ど (do) | | | |
| ぼ (bo) | | | |
| ぽ (po) | 40 | | |
| きょ (kyo) | | 70 | |
| じょ (jo) | | | |
| びょ (byo) | | 50 | |
| ぴょ (pyo) | | 60 | |
| ん (n) | | | |

FIG. 7

| SYLLABLE NAME \ SYLLABLE POSITION i | FIRST SYLLABLE | SECOND SYLLABLE | THIRD SYLLABLE | FOURTH SYLLABLE | FIFTH SYLLABLE |
|---|---|---|---|---|---|
| あ (ə) | (30) | 20 | 10 | | |
| か (kə) | | | | | |
| さ (sə) | | | | | |
| う (u) | | 70 | (80) | 70 | 60 |
| く (ku) | | 40 | (50) | 40 | 30 |
| す (su) | | | | | |
| ふ (pu) | | 30 | (40) | 30 | 20 |
| え (e) | | | | | |
| お (o) | | | | | |
| こ (ko) | | | | | |
| そ (so) | | | | | |
| と (to) | (80) | 70 | 60 | | |
| の (no) | | | | | |
| ご (go) | | | | | |
| ぞ (zo) | | | | | |
| ど (do) | | | | | |
| ぼ (bo) | | | | | |
| ぽ (po) | (40) | 30 | 20 | | |
| きょ (kyo) | 60 | (70) | 60 | 50 | |
| じょ (jo) | | | | | |
| びょ (byo) | 40 | (50) | 40 | 30 | |
| ぴょ (pyo) | 50 | (60) | 50 | 40 | |
| ん (n) | | | | | |

SPEECH RECOGNITION APPARATUS

This application is a continuation of application Ser. No. 07/287,329, filed on Dec. 21, 1988, now abandoned.

BACKGROUND OF THE INVENTION

1. Field of the Invention

The present invention relates to a speech recognition apparatus which can recognize a speech input with high accuracy.

2. Description of the Related Art

A word recognition apparatus which recognizes a word consisting of n syllables or a word consisting of n characters is known, as disclosed in, e.g., Japanese Patent Disclosure (Kokai) No. 59-197974.

The recognition apparatus performs recognition processing of syllables $A_i$ (i=1, 2, ..., n) of a speech input consisting of n syllables, and obtains similarities (or differences) $S_{k,i}$ (k and i respectively indicate a syllable name and number) between syllables $A_i$ (i indicates the syllable number) and syllables $B_k$ to be recognized (k=1, 2, ..., m; k indicates a syllable name). (The syllables to be recognized are all the syllables to be compared with syllables $A_i$; for example, in Japanese, there are 101 categories as single syllables). The apparatus then stores similarities $S_{k,i}$ at specific storage positions on a similarity memory defined by syllables $B_k$ to be recognized and their syllable positions i. The similarities stored at positions on the similarity memory defined by syllable codes $C_i$ (i=1, 2, ..., n) of dictionary words registered in a dictionary memory and syllable positions i of syllable codes $C_i$ in the dictionary words are obtained for syllables of the dictionary words. Thereafter, coincidences between syllables $A_i$ of the speech input and syllables $C_i$ of the dictionary words are computed based on the similarities obtained from the similarity memory, and dictionary words having high coincidences are obtained as recognition candidates of the speech input.

With this speech input recognition method, a speech input can be easily and appropriately recognized at high speed, and can be input as data.

However, as a voiced speech input becomes natural, some of syllables $A_i$ (i=1, 2, ..., n) of the speech input may be omitted, or one syllable is extracted as a plurality of syllables. For example, if syllable A3 of the speech input is omitted, a recognition series is:

A1, A2, A4, A5, ..., An

If syllable A2 of the speech input is extracted as two syllables A2' and A2", the recognition series is:

A1, A2', A2", A4, A5, ..., An

If such cases occur, an error due to shift in syllable positions after C3 is generated in computations of coincidences for syllable code strings $C_i$ (i=1, 2, 3, ..., n) of dictionary words, and correct coincidences cannot be obtained. As a result, a speech input cannot be accurately recognized.

SUMMARY OF THE INVENTION

It is an object of the present invention to provide a practical speech recognition apparatus which can easily recognize a voiced speech input with high accuracy.

In order to achieve the above object, a speech recognition apparatus of the present invention comprises: reference pattern memory means for storing reference syllable data; a syllable recognition section for collating each syllable of a speech input with a reference pattern from the reference pattern memory to compute at least one syllable recognition candidate and its similarity, and obtaining at least one subsidiary similarity from the similarity of the syllable recognition candidate; a similarity memory for storing the syllable recognition candidate and its similarity supplied from the syllable recognition section at a specific position defined by the reference syllable data and its syllable position, and storing the subsidiary similarity at a storage position corresponding to a shifted syllable position; a dictionary memory for storing a syllable string of a speech item to be recognized; a coincidence computing section for accessing the similarity memory using syllables constituting the syllable code string output from the dictionary memory and their syllable positions as address data, and adding obtained similarities so as to obtain coincidences between the speech input and the syllable code string; and means for comparing the coincidences of the syllable code string by the coincidence computing section to obtain a recognition result of the speech input.

According to the present invention, a speech input apparatus which performs recognition processing of syllables of a speech input consists of a plurality of syllables and coincidences between a syllable code string obtained as the recognition result and syllable code strings of dictionary words registered in a dictionary memory so as to recognize the speech input. Computations of the coincidences are executed also for syllable code strings obtained by shifting syllable positions of the syllable code string obtained as the recognition result.

More specifically, similarities between syllables of the speech input and syllables to be recognized are stored at storage positions on a similarity memory defined by their syllable positions and the syllables to be recognized, and subsidiary similarities computed from the similarities obtained for the syllables to be recognized are stored at storage positions on the similarity memory corresponding to shifted syllable positions. A sum of similarities of continuous n syllables is obtained from this similarity memory to compute coincidences. If a shift in syllable position caused by omission or addition of syllables occurs, a correct recognition result of the speech input can be obtained.

According to the present invention, similarities when syllable positions are shifted are computed from those for syllables to be recognized obtained in units of syllable positions in correspondence with syllables of the speech input, and these similarities are totally discriminated to obtain a syllable series corresponding to the dictionary word. Therefore, even if a shift in syllable position caused by omission or divisional extraction of syllables occurs during a recognition process of each syllable of the speech input, the speech input can be correctly recognized.

A syllable code string obtained by performing recognition processing of syllables of a speech input with respect to a syllable code string of a dictionary word registered in the dictionary memory is generated also assuming a case wherein a shift in syllable position occurs, and a coincidence is computed between these syllable code strings to recognize the speech input. As a result, even if a syllable to be recognized is omitted from the speech input, or even if an unnecessary syllable is added, a shift in syllable position caused thereby can be effectively absorbed, and the speech input can be recognized with high accuracy.

BRIEF DESCRIPTION OF THE DRAWINGS

Other objects and features of the present invention will be apparent from the following description taken in connection with the following figures in which:

FIG. 1 is a block diagram showing an embodiment of a speech recognition apparatus according to the present invention;

FIG. 2 is a view for explaining the relationship among syllables of a speech input, and their syllable candidates and similarities;

FIG. 3 is a view showing a storage format of syllable candidate data in a similarity memory;

FIG. 5 is a view for explaining the relationship among syllables of a speech input, and their syllable candidates and similarities when omission of a syllable occurs;

FIG. 6 is a view showing a storage format of the syllable candidate data shown in FIG. 5 in the similarity memory;

FIG. 7 is a view showing a data storage structure on the similarity memory in the embodiment shown in FIG. 1.

DETAILED DESCRIPTION OF THE PREFERRED EMBODIMENT

Figure 4:
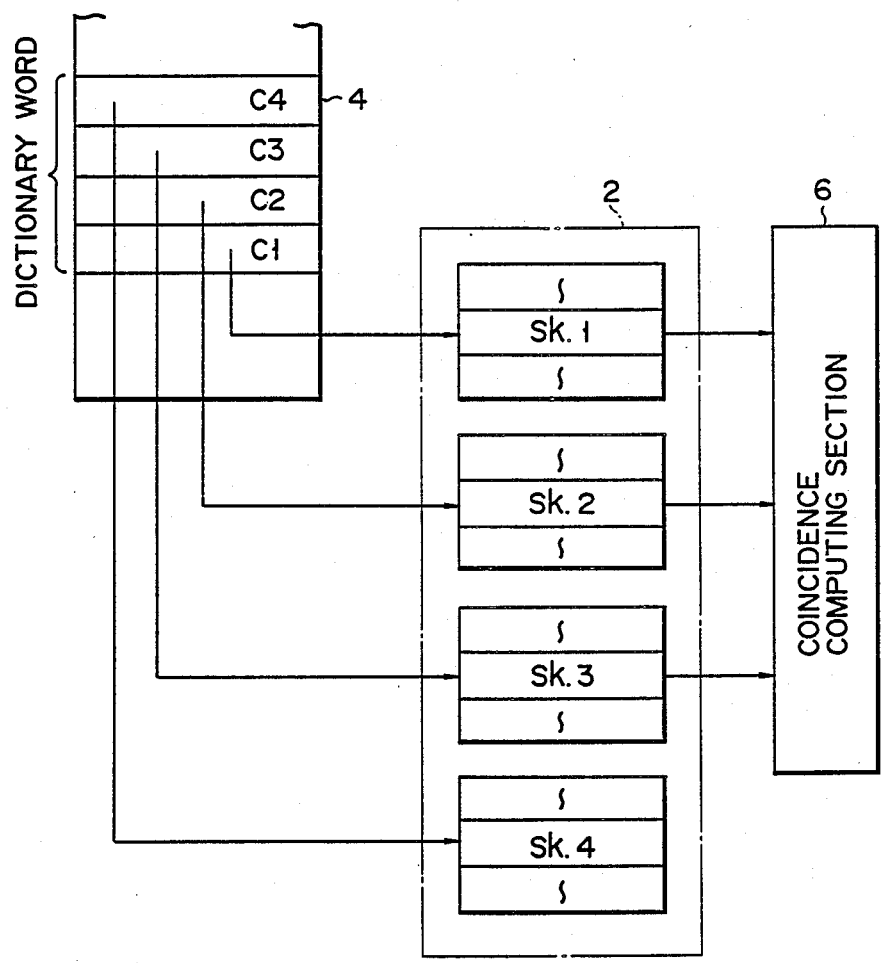
FIG. 4 is a view showing the principle of similarity memory retrieval processing in the embodiment shown in FIG. 1.

An embodiment of the present invention will be described hereinafter with reference to the accompanying drawings.

FIG. 1 is a view showing a schematic arrangement of a main part of the apparatus according to the embodiment. In FIG. 1, reference numeral 1 denotes a syllable recognition section for recognizing a speech input consisting of n syllables in units of syllables. Syllable recognition section 1 sequentially collates syllables of a speech input with reference patterns in syllable dictionary (reference pattern) memory 9, and computes its similarity, thus obtaining, e.g., first through third syllable candidates. More specifically, if a word " " is input by speech, first through third candidates and similarities of the syllable candidates are obtained for each syllable, as shown in FIG. 2. Syllable recognition section 1 can comprise, e.g., a digital signal processor.

The similarities of the syllable candidates obtained by syllable recognition section 1 are stored in similarity memory 2 in accordance with the syllable candidates and syllable positions in the speech input, and are then subjected to recognition processing.

Similarity memory 2 has a memory structure for storing similarities at storage positions according to syllable names and syllable positions, as shown in FIG. 3. The similarities of syllable candidates of the syllables obtained from the speech input are stored at positions of syllable names corresponding to the syllable candidates and designated by syllable positions in the word speech input.

More specifically, when syllable candidates are obtained for speech input " " (pronounced as (tokyo), as shown in FIG. 2, the similarities obtained for the syllable candidates of, e.g., the first syllable are stored such that similarity (30) is stored at the position of syllable name " " (pronounced as ( )); similarity (80) at the position of syllable name " " (pronounced as (to)); and similarity (40) at the position of syllable name " " (pronounced as (po)), as shown in FIG. 2.

Similarly, for the second syllable, similarity (50) is stored at the position of syllable name " " (pronounced as (u)); similarity (70) at the position of syllable name " " (pronounced as (ku)); and similarity (60) at the position of syllable name " " (pronounced as (fu)). Furthermore, for the third syllable, similarity (70) is stored at the position of syllable name " " (pronounced as (po)); similarity (50) at the position of syllable name " " (pronounced as (byo)); and similarity (60) at the position of syllable name " " (pronounced as (pyo)).

For the fourth syllable, similarity (80) is stored at the position of syllable name " " (pronounced as (u)); similarity (50) at the position of syllable name " " (pronounced as (ku)); and similarity (40) at the position of syllable name " " (pronounced as (pu)).

Note that the similarities of the syllable candidates up to the fourth syllable are stored in similarity memory 2. However, the number of syllables to be stored can be determined in accordance with the number of syllables constituting an input word, as a matter of course. Storage of similarities in correspondence with syllable positions is performed using syllable codes output from dictionary memory 4 and address values from syllable position counter 3 as address data.

Dictionary memory 4 stores a syllable series of a speech to be recognized (dictionary word). A syllable series of each speech to be recognized is expressed by, e.g., a series of syllable codes.

A similarity of a given syllable candidate is obtained based on a syllable code of a dictionary word stored in dictionary memory 4, and syllable position data from syllable position counter 3. That is, address counter 5 supplies address values to the dictionary memory under the control of control section 7 so that dictionary words having the same number of syllables as that of the speech input are output from dictionary memory 4. Similarities stored at positions on similarity memory 2 specified by syllable names and their syllable positions of the dictionary word are obtained in cooperation with control for syllable positions by syllable position counter 3, and are supplied to coincidence computing section 6.

More specifically, as principally shown in the FIG. 4, if a dictionary word registered in dictionary memory 4 is given by syllable codes [C1, C2, C3, C4], similarity Sk,1 is stored at a position on similarity memory 2 specified by syllable name [C1] in order to obtain the first syllable position, and similarity Sk,2 is stored at a position specified by syllable name [C2], in order to obtain the second syllable position, and similarity Sk,3 is stored at a position specified by syllable name [C3], in order to the third syllable position, and similarity Sk,4 is stored at a position specified by syllable name [C4] in order to obtain the fourth syllable position.

Coincidence computing section 6 adds the similarities obtained from similarity memory 2 in accordance with the syllables and their syllable positions of the dictionary word sequentially read out from dictionary memory 4, thus obtaining a coincidence with respect to the dictionary word.

Normally, for a speech consisting of n syllables, a similarity for a syllable code of an (i)th syllable is obtained as Si from similarity memory 2, and similarities obtained for corresponding syllable positions are added to obtain coincidence TS given by:

$$TS = \sum_{i=1}^{n} Si$$

Control section 7 compares coincidences obtained in correspondence with the dictionary words, and obtains x dictionary words having high coincidences as speech recognition candidates of the speech input.

Note that syllable recognition control section 8 controls speech input syllable recognition processing using syllable recognition section 1, and controls start of speech input recognition processing in units of speech inputs under the control of control section 7. Syllable recognition section 8 can comprise a 16-bit microprocessor M68000 available from Motorola, U.S.A.

According to the apparatus of the present invention with the above arrangement, when a speech word " " is input as described above, syllable candidates for syllables of this speech input are obtained as shown in FIG. 2, and similarity data are obtained in similarity memory 6, as shown in FIG. 3, so that coincidence data obtained for the speech input to be recognized are registered in dictionary memory 4, as follows.

Since the speech input consists of four syllables, dictionary words each consisting of four syllables are sequentially read out from dictionary memory 4, and the positions of similarity memory 2 specified by syllable names and syllable positions of the dictionary words are retrieved to read out similarities stored thereat.

For example, similarity memory 2 is accessed for dictionary word " ; togane", and similarity (80) for the first syllable, similarity (50) for the second syllable, similarity (0) for the third syllable, and similarity (0) for the fourth syllable are respectively obtained. As a result, coincidence TS of the speech input with respect to this dictionary word is obtained as (80+50+0+0=130). Similarly, coincidences TS are sequentially obtained for other dictionary words.

When a dictionary word " ; tokyo" is read out from dictionary memory 4, similarity (80) for the first syllable, similarity (50) for the second syllable, similarity (70) for the third syllable, and similarity (80) for the fourth syllable are respectively obtained. In this case, coincidence TS of the speech input for this dictionary word is obtained as (80+50+70+80=280). The coincidences obtained in correspondence with the dictionary words are compared with each other, and it is confirmed that the coincidence obtained for the dictionary word " ; tokyo" is highest. As a result, the dictionary word " " is obtained as a recognition candidate of the speech input.

Assume that during the recognition process of syllables for the speech input " ; tokyo" described above, a syllable is omitted, and a syllable candidate consisting of three syllables is obtained as shown in FIG. 5. In this case, similarity data is stored in similarity memory 2, as shown in FIG. 6. More specifically, when the speech input " " (pronounced as (tokyo)) consisting of four syllables is recognized in units of syllables, if the second syllable " " cannot be detected, the speech input is processed as a speech " " consisting of three syllables, and as a result, the fourth syllable cannot be detected. Thus, recognition candidates of the second and third syllables are detected to be shifted from their original syllable positions.

When such a case occurs, since the dictionary word " ; tokyo" registered in dictionary memory 4 consists of four syllables, a coincidence computation with the speech input cannot be performed, and the speech input cannot be correctly recognized. If the first through third syllables are subjected to matching processing to obtain a coincidence, the syllable code string of the second and third syllables includes a shift. Therefore, coincidence TS of this speech input is obtained as a very small value (80+0+0=80) since similarity (80) for the first syllable, similarity (0) for the second syllable, and similarity (0) for the third syllable are obtained. Thus, there is only a small possibility of correct recognition of the speech input.

The characteristic feature of the apparatus of the present invention lies in the fact that when similarities of syllable candidates obtained in correspondence with syllables of the speech input are stored in similarity memory 2, new similarities obtained from the above similarities are also stored at storage positions corresponding to shifted syllable positions, thus absorbing a shift in syllable position caused by omission or addition of syllables, and executing coincidence computing processing.

FIG. 7 shows a data format of similarity memory 4 obtained by performing such processing. Encircled numerical values indicate similarities of recognition candidates obtained by performing recognition processing of syllables of a speech input. Note that FIG. 7 is presented in comparison with FIG. 6 showing the content of the similarity memory when the second syllable of " " is omitted.

In this case, in order to cope with omission of a maximum of two syllables, new similarity (j−10) generated from similarity j obtained for an (i)th syllable is stored at an (i+1)th syllable position of the same syllable name, and new similarity (j−20) is stored at an (i+2)th syllable position of the same syllable name. A reduction of the similarity is determined in accordance with a shift value.

In this case, in order to cope with addition of one syllable, new similarity (j−10) obtained from similarity j obtained for the (i)th syllable is stored at the (i−1)th syllable position of the same syllable name.

Figure 8:
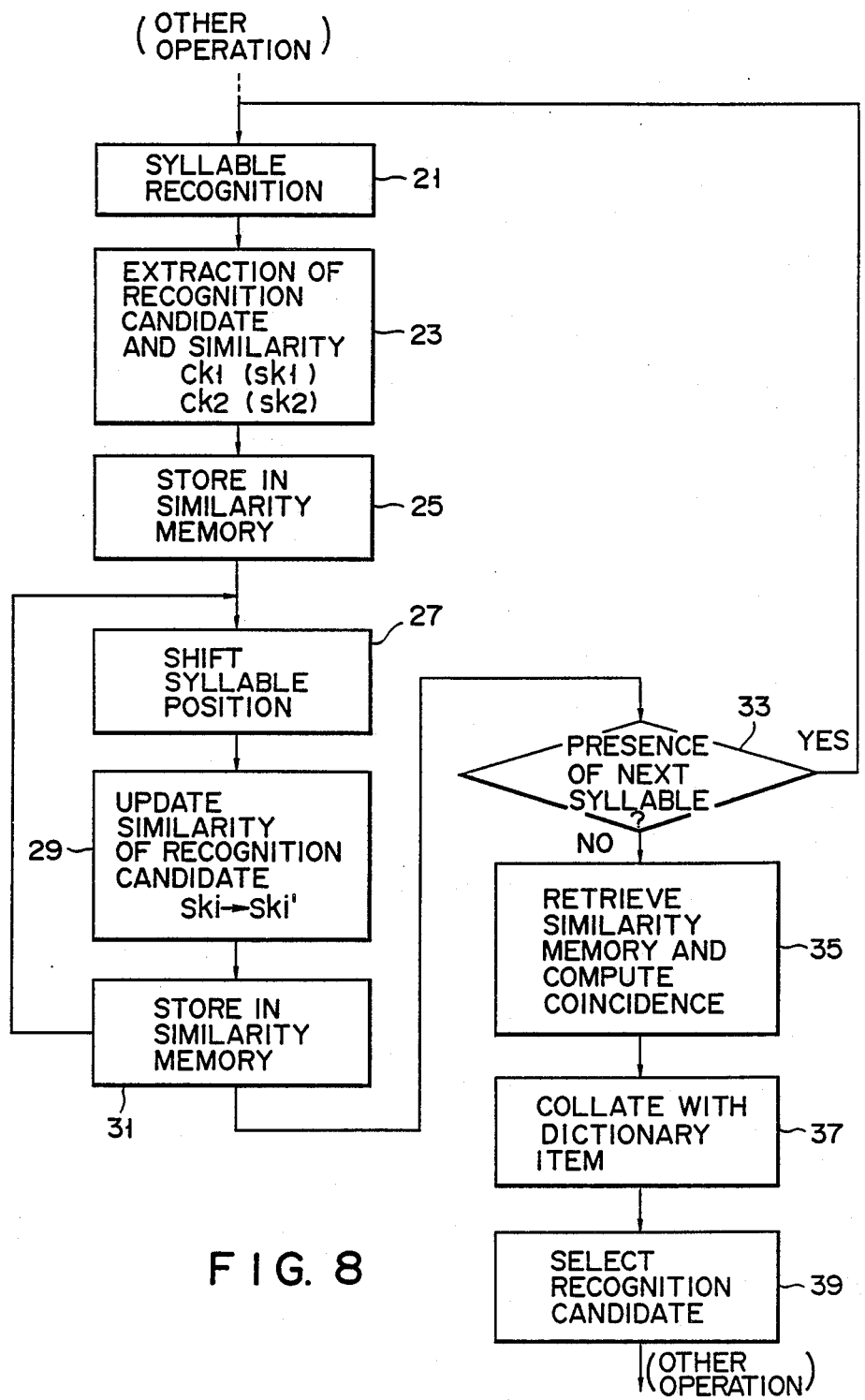
FIG. 8 is a flow chart showing syllable recognition processing in the embodiment shown in FIG. 1.

More specifically, as shown in the processing procedures in FIG. 8, by detection of syllables with respect to a speech input and its syllable recognition (step 21), a recognition candidate and a similarity with which the recognition candidate is obtained are extracted (step 23). The similarity is stored in similarity memory 2 (step 25). Thereafter, the syllable position where the recognition candidate is extracted is shifted (step 27), and the similarity with which the corresponding recognition candidate is obtained is updated in accordance with the shift amount (step 29). The updated similarity is stored in similarity memory 2 in accordance with the shifted syllable position (step 31). The shift processing of the syllable position is performed like (i−1), (i+1), (i+2), . . . , if a current syllable position is given by i.

Each time a syllable is extracted from the speech input, the above-mentioned processing is repetitively executed (step 33).

After the data architecture of similarity memory 2 is constituted as described above, matching processing with the dictionary words registered in dictionary memory 4 is executed for the (i−1)th, (i)th, (i+1)th, and (i+2)th syllables for each syllable, and coincidences TS are simultaneously computed (steps 35, 37). In this case, since coincidences of candidates having different numbers of syllables are computed, the following arithmetic operation is preferably executed using weighting coefficient w(j) based on the number of syllables to normalize the coincidence:

$$TS = TS/w(j)$$

Thereafter, obtained coincidences can be compared with each other. A recognition candidate is extracted from the dictionary words in accordance with the comparison result (step 39).

According to the coincidence computation executed using similarity memory 2, a coincidence obtained for the dictionary word " ; tokyo" is:

$$TS = 80 + 70 + 60 + 70 = 280$$

A value obtained by normalizing the coincidence can be a sufficiently large value:

$$TS' = TS/w(4) = 280/w(4)$$

As a result, if syllable recognition is executed while the second syllable is omitted, the speech input can be recognized with high accuracy. More specifically, even if a recognition candidate having a highest similarity obtained for a speech input including omission of a syllable cannot be obtained, the possibility of obtaining a correct candidate as a subsidiary candidate having a second or lower similarity is very high, and as a result, a recognition probability can be improved.

When the above-mentioned speech input apparatus is used as an input apparatus for another equipment, a remarkable effect can be obtained. That is, in a normal conversation or speech, omission of syllables often occurs, the conventional apparatus cannot cope with this, and reliable input cannot be achieved unless words are slowly spoken word by word. In contrast to this, in the speech input apparatus described above, even if a speech includes omission of syllables, it can be obtained as a subsidiary recognition candidate having a second or lower similarity. Thus, the subsidiary recognition candidates are presented to an operator to select a correct one, so that a speech need not be input carefully, resulting in improved convenience.

Note that the present invention is not limited to the above embodiment. In order to cope with omission of a maximum of two syllables and addition of one syllable, similarities are stored at shifted syllable positions. A shift amount of a syllable position can be determined along with use of the apparatus. A degree of reduction of the similarity can also be determined accordingly. Various other changes and modifications may be made within the spirit and scope of the invention.

What is claimed is:

1. A speech recognition apparatus comprising:
   means for storing reference patterns corresponding to reference phonemes, respectively;
   means for extracting individual patterns of phonemes from an input utterance;
   means for comparing individual patterns of phonemes which have been extracted from an input utterance with the reference patterns and producing a comparison result;
   means for obtaining a positive similarity value j of at least one reference phonemes based on the comparison result;
   memory means having a plurality of areas corresponding to all the reference phonemes, phoneme positions being assigned in time-axis direction for each of the reference phonemes and the areas being provided corresponding to the respective phoneme positions and storing the similarity values;
   means for storing in the area defined by the reference phoneme and the phoneme position, the similarity value j obtained by said similarity value obtaining means;
   means for obtaining subsidiary similarity values having smaller values than the similarity value j;
   means for temporarily storing the subsidiary similarity values in areas defined by immediately before and after the phoneme position of the same reference phoneme;
   means for preliminarily storing words to be recognized;
   means for extracting the similarity value j from said similarity value storing means and the subsidiary similarity values from said similarity value temporary storing means in accordance with the individual phonemes of a word from said word storing means;
   means for accumulating the extracted similarity values from said similarity extracting means; and
   means for recognizing the word based on the accumulated result from said accumulating means.

2. A speech recognition apparatus comprising;
   means for storing reference patterns corresponding to reference phonemes, respectively;
   means for extracting individual patterns of syllables from an input utterance;
   means for comparing individual patterns of syllables which have been extracted from an input utterance with the reference patterns and producing a comparison result;
   means for obtaining a positive integer similarity value j of at least one reference syllable based on the comparison result;
   memory means having a plurality of areas corresponding to all the reference syllables, syllable positions being assigned in time-axis direction for each of the reference syllables and the areas being provided corresponding to the respective syllable positions and storing the similarity values;
   means for storing, in the area defined by the reference syllable and the syllable position, the similarity value j obtained by said similarity value obtaining means;
   means for obtaining subsidiary similarity values having smaller values than the similarity value j;
   means for temporarily storing the subsidiary similarity values in areas defined by immediately before and after the syllable position of the same reference syllable;
   means for preliminary storing words to be recognized;
   means for extracting the similarity value j from said similarity value storing means and the subsidiary similarity values from said similarity value temporary storing means in accordance with the individual phonemes of a word from said word storing means;
   means for accumulating the extracted similarity values from said similarity extracting means; and
   means for recognizing the word based on the accumulated result from said accumulating means.

* * * * *